Sept. 30, 1958
R. W. THOMAS
2,854,494
PROCESS FOR PURIFICATION OF CRYSTALS
Filed March 17, 1955
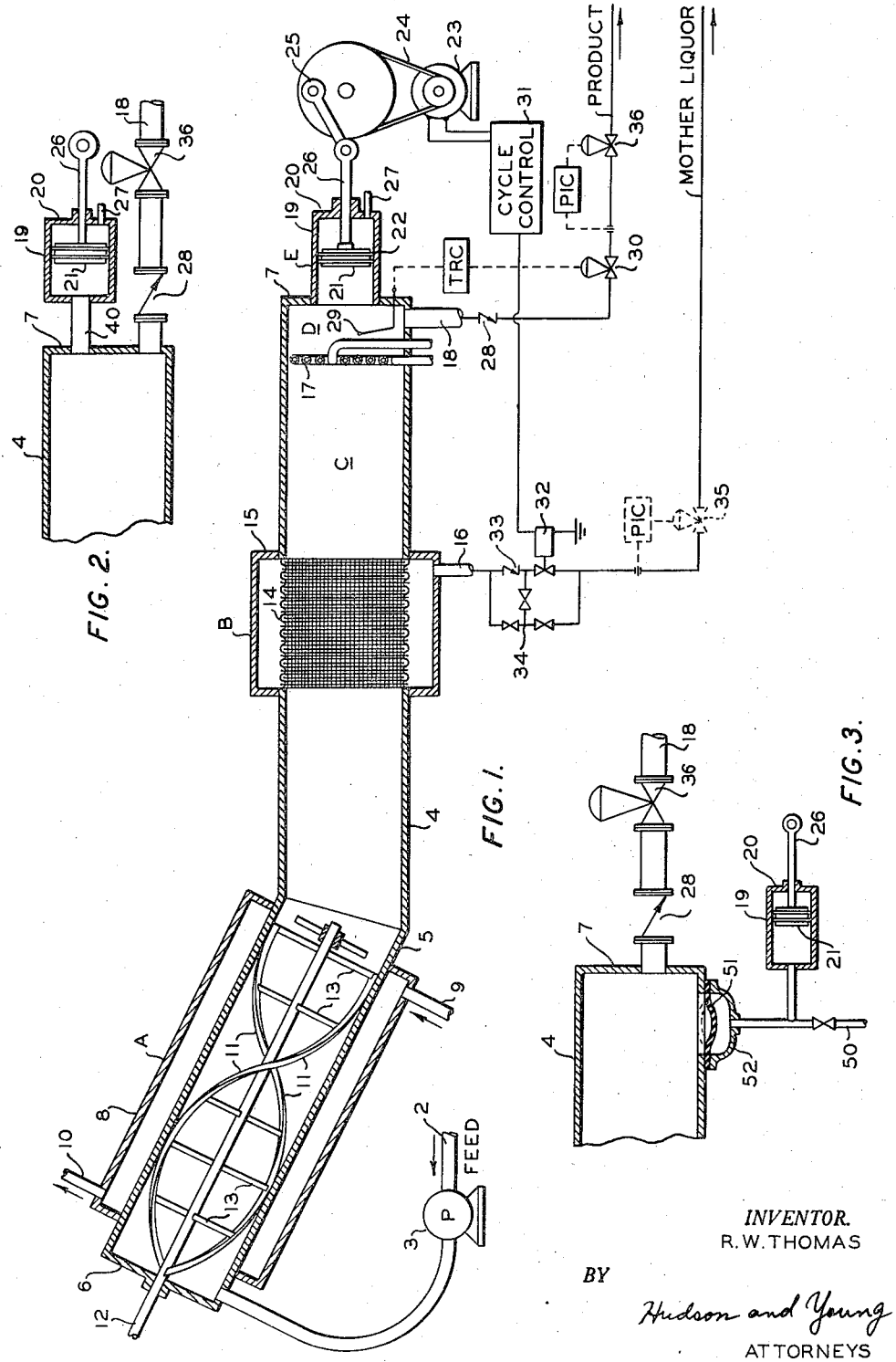
INVENTOR.
R. W. THOMAS
BY
Hudson and Young
ATTORNEYS United States Patent Office 2,854,494
Patented Sept. 30, 1958

2,854,494

PROCESS FOR PURIFICATION OF CRYSTALS

Rosswell W. Thomas, Bartlesville, Okla., assignor to Phillips Petroleum Company, a corporation of Delaware Application March 17, 1955, Serial No. 494,866

11 Claims. (Cl. 260—674)

This invention relates to a process for the resolution of mixtures by crystallization. In one aspect, it relates to an improved apparatus for crystal purification.

Purification by means of fractional crystallization has been known for a number of years. Schmidt Re. 23,810 (1954) discloses a process and apparatus for purifying crystals, which process involves moving a mixture of crystals and adhering liquid through a liquid removal zone, a reflux zone and a melting zone, removing liquid in said liquid removal zone, melting crystals in said melting zone, withdrawing part of the melt as product and forcing another part of the melt in a direction countercurrent to the movement of crystals in said reflux zone. This process is generally applicable to the separation of at least one pure component from any mixture which is resolvable into its components by fractional crystallization. For example, the process can be used for the concentration of fruit juices, vegetable juices, and other materials which comprise aqueous solutions which can be concentrated by the formation and removal of ice crystals. The process is also of great value in the resolution of non-aqueous mixtures, an example of such an application being the separation of para-xylene from a mixture thereof with the other xylene isomers and ethyl benzene.

The present invention provides a process and an apparatus for effecting a separation of the type described at higher throughput rates, improved stability and ease of operation, and improved heat distribution. In addition, products of high purity are obtainable over long periods of operation.

According to this invention, in a process wherein solids are countercurrently contacted with a liquid in a purification zone, the solids are supplied continuously to said zone while the liquid is supplied intermittently.

Further, according to this invention, there is provided, in a process which comprises moving a mass of solids, together with adhering liquid, through a liquid removal zone, then through a reflux zone and finally through a melting zone, withdrawing liquid in said liquid removal zone, melting at least part of said solids in said melting zone, removing part of the melt from said melting zone and forcing another part of said melt into said reflux zone in a direction countercurrent to the movement of solids therethrough, the improvement which comprises contacting the solids in said zones with an intermittent flow of reflux liquid simultaneously with the propulsion of said solids through said zones.

Further in accordance with this invention, there is provided, in an apparatus comprising a purification chamber, liquid-solid separation means in said chamber, melting means positioned in one end of said chamber, means for moving solids to said separation means and thence toward said melting means, means for removing melt from said chamber, and means for removing liquid from said separation means, the improvement which comprises means for producing an intermittent fluid flow in a direction from said melting means toward said liquid-solid separation means.

According to one embodiment of the invention, a mass of crystals to be purified, together with accompanying liquid, is passed through a purification chamber containing a filter which is integral with the wall of said chamber and positioned at an intermediate part thereof, then through a reflux zone toward a heating means positioned in one end of the chamber, which heating means melts the crystals which arrive in the vicinity thereof. The melt is withdrawn in part as purified product, and forced, in part, into the reflux zone toward the filter, and a pulsating back pressure is applied to the contents of the purification chamber by means of a reciprocating piston positioned in a cylinder which is in open communication with said chamber at the end in which said heating means is positioned. The reciprocating motion of the piston can be produced by means which are well understood in the art, for example, by a mechanical crank attached to a motor or by an electric oscillator. The back pressure is sufficient to produce a counterflow of liquid relative to the movement of the crystals. Thus, according to this invention, when the solids are supplied steadily during a given period of time to the purification zone, the reflux or other purifying liquid is moved intermittently in the opposite direction, i. e., countercurrently with respect to the solids.

The drawing illustrates three embodiments of this invention.

Figure 1 illustrates one embodiment of this invention wherein pressure pulsations are produced by a reciprocating piston.

Figure 2 illustrates a modification of the apparatus of Figure 1.

Figure 3 illustrates a further modification wherein a flexible diaphragm is utilized.

Corresponding numerals indicate corresponding parts in each of the three figures.

The apparatus of Figure 1 comprises freezing or crystallizing means A, a filtering means B, a reflux zone C, a melting section D, and a pulsation-producing device E.

A feed mixture comprising two or more components, one of which is separable from the mixture by crystallization, enters the apparatus through inlet 2 and is forced by means of pump 3 into the chilling section A of the main purification column. The purification apparatus is composed of a cylindrical shell 4, to which is attached a cooling section which comprises a cylindrical shell 5. The shells 4 and 5 can be constructed of ordinary metal pipe and can be welded together at any desired angle, as indicated in the drawing; or they can be connected by flanges or by threads. Alternatively, they can be one single length of pipe which can be built in the form of an elbow at any desired angle. The particular angle shown in the drawing can vary within a very broad range or the entire apparatus can be straight.

The purification apparatus is closed by means of end members 6 and 7, which can be of any suitable form known in the art. Crystallization section A comprises, in addition to shell 5, a cooling jacket 8 having inlet 9 and outlet 10. Positioned within the crystallization section is an agitating or scraping means 11, which is designed to prevent the accumulation of solid material on the heat exchange surface. Scrapers 11 are suitably constructed of strips of metal or other suitable materials known in the art. They can be fabricated in the form of a helix, as indicated in the drawing, or can be straight. Any suitable number of scrapers 11 can be provided. They are mounted on a rotatable shaft 12 by means of members 13. Shaft 12 is axially positioned in shell 5 and is connected to any suitable source of power for rotating the scrapers, such power source not being shown in the drawing. Shaft 12 is suitably sealed in end member 6 by means of a packing gland of any desired type known in the art. Suitable cooling of the feed which enters shell 5 can be provided by adding a coolant through inlet 9 and withdrawing the coolant through outlet 10. Sufficient cooling in section A is provided so that a predetermined amount of solid crystals is produced, as subsequently discussed herein. The resulting crystal mass passes through purification chamber 4 and into filter section B.

As a general rule, the feed pump 3 is generally suitable for forcing the crystal mixture through the purification column. However, other means for propelling the mixture through the purification zone can be provided, as shown in the cited Schmidt reissue patent. Where such means, for example, a piston, is provided, it can be positioned upstream from section A or intermediate the chilling section A and purification section 4, or other suitable arrangements can be provided by those skilled in the art.

Filtration section B comprises a suitable filter medium 14 and an external shell 15, the latter being provided with an outlet pipe 16 for filtrate. Filter medium 14 can be of any desired type known in the art. For example, it can comprise a metallic screen, a sintered perforate metal member or a perforate metal member supporting a filter cloth. In any event, it is desirable that the filter member 14 be positioned integrally with respect to the shell 4.

Filtrate produced in filter zone B is removed from the system through outlet 16.

The remaining crystal mass passes through reflux zone C wherein it is countercurrently contacted with liquid reflux produced as subsequently described.

As the crystal mass approaches heater 17 in melting section D, the crystals are melted. Heater 17 can be in the form of an electrical heater or a heat transfer coil through which a suitably heated fluid is pumped. Part of the melt produced by heater 17 is withdrawn through outlet pipe 18 as a purified product of the process. The remainder of the melt is forced back through reflux zone C to form reflux which effects crystal purification, the resulting liquid being drawn off through outlet 16, together with the filtrate. Although an internal heater 17 is shown, an external heater, for example, a heating jacket encompassing section D and provided with means for circulating a heating fluid therethrough, can be used, if desired.

The pulsation-producing member E comprises a cylinder 19 which is suitably attached to closure member 7 as, for example, by welding, and closure means 20, together with a reciprocatable piston 21. Piston 21 is suitably sealed in cylinder 19, for example, by means of rings 22, to prevent the leakage of melt from the purification. Reciprocation of piston 21 is produced, for example, by an electric motor 23, a belt 24, a crank means 25, and connecting rods 26, which can be sealed in closure member 20 by means of a packing gland. An outlet 27 is provided in closure member 20 to facilitate the reciprocation of piston 21 and can be connected to means, not shown, for recovery of any material which might escape from column 4 in case of failure of rings 22.

While the crystal mass is being advanced from chilling section A through filtration section B, reflux section C, and melting section D, piston 21 is reciprocated at a suitable rate, which is subsequently discussed herein, so that a pulsating pressure is exerted on the melt reflux which is intermittently forced back, countercurrently with respect to the crystal mass, through reflux zone C. In melt outlet 18 is positioned a check valve 28 to prevent the back flow of withdrawn melt into the crystal purification column. A temperature recorder-controller, designated in the drawing as TRC, is provided and is connected to a suitable temperature sensitive device, such as a thermocouple indicated by the numeral 29. The thermocouple is preferably positioned within the purification column at a point adjacent heater 17. The temperature recorder-controller is also operatively connected to a valve 30. The temperature recorder-controller is of any suitable design known in the art and can suitably comprise a device of known design for converting the electrical effect produced by thermocouple 29 to an air pressure which is utilized to open or close valve 30. The temperature recorder-controller is suitably so adjusted that an undesirably rapid advance of crystals through reflux zone C results in a predetermined low temperature which is measured by thermocouple 29, which operates through the temperature recorder-controller to throttle valve 30 and decrease the rate of withdrawal of melt. An undesirably slow advance of crystals through the purification column produces the opposite effect. The described combination of apparatus and the method for controlling melt withdrawal rate is disclosed and claimed in copending application Serial No. 514,499, filed June 10, 1955, by J. D. Ratje.

Also shown in the drawing is a cycle control device 31, of known design, which is operatively connected with motor 23 so that an electrical pulse is produced in synchronism with piston 21. The cycle control 31 can be so adjusted that, on the compression stroke of piston 21, an otherwise closed solenoid valve 32 is opened, resulting in the removal of filtrate from the purification column only on the compression stroke of piston 21. Also provided, to aid in accomplishing this effect, is check valve 33 in filtrate withdrawal line 16. A similar arrangement can be effected in connection with the withdrawal of melt through outlet 18. However, it is preferred, in such a case, that the melt withdrawal cease during the compression stroke of the piston. Means for producing this result are not shown in the drawing. Cycle control means 31 can, for example, be operatively connected to crank 25 or connecting rods 26. It can include an electrical make-and-break device, such devices being well known in the art.

It has been found that although the described synchronism of withdrawal with the compression stroke of the piston 21 produces satisfactory results, it is not necessary for obtaining the benefits of this invention. A suitable, and often preferred, arrangement is to utilize bypass 34, solenoid valve 32 and/or check valve 33 being closed and by-passed. In this mode of operation, it is desirable to utilize a predetermined back-pressure on the liquid being withdrawn through outlet 16. This back-pressure is to be distinguished from that intermittently applied by the piston within the column. The filtrate or mother liquor back-pressure is an external back-pressure and can be constant; it need not be intermittent. For the purpose of controlling filtrate back-pressure, a pressure indicator-controller designated as PIC in line 16, can be utilized. This instrument is of a type well known in the art and converts a back-pressure in the liquid withdrawal line 16 to an air pressure, which suitably throttles motor valve 35 to maintain a desired back-pressure in line 16. A similar instrument arrangement can be utilized in connection with valve 36 in melt withdrawal line 18. The foregoing external back-pressure control is disclosed and claimed in copending application Serial No. 514,499, filed June 10, 1955, by J. D. Ratje.

It is also within the scope of this invention to withdraw melt through outlet 18 at a constant rate, utilizing metering equipment known in the art.

In the arrangement shown in Figure 2, the cylinder 20 is spaced from the cylinder 4 and is connected therewith by means of an open conduit 40.

In Figure 3, the piston 20 is separated from the contents of the purification column by means of an intermediate fluid which is supplied through valved conduit 50. The piston acts directly upon the intermediate fluid and, in turn, produces a pulsation of a flexible diaphragm 51, which is suitably sealed within a chamber 52. The intermediate fluid can be any noncorrosive fluid. It is preferably a liquid, such as a mineral lubricating oil or a vegetable oil, which is inert with respect to the materials being separated in column 4 and which is readily separable from said materials, in case it should inadvertently become mixed therewith. Diaphragm 51 can be protected from rupturing by providing a spring-biased relief valve (not shown) in line 50 between the inlet valve and chamber 52. Alternatively, diaphragm 51 can be actuated pneumatically, or by means of a direct, reciprocating, mechanical linkage attached to the diaphragm, or electrically, as by means of a solenoid, or by any other desired means for producing a reciprocating flexure. Also, the diaphragm can be placed in end member 7, e. g., concentrically therewith, or can replace end member 7, the melt being withdrawn from a side outlet. Further, the diaphragm can be sonically or supersonically, or even subsonically, vibrated.

Although purification chamber 4 is shown positioned horizontally, it can be operated in other positions; for example, it can be maintained in a vertical position with cylinder 20 and piston 21 at the top. This arrangement utilizes gravity as an aid to the flow of reflux.

Although, as stated, an additional piston can be utilized for propelling the crystals through the crystallization column, I have found that such a device is ordinarily unnecessary, suitable propulsion being provided by a feed pump 3, especially when the purification column is horizontal or nearly horizontal. It is, however, within the scope of this invention to utilize two pistons, one to propel the crystals through the purification column and the other to produce a pulsating reflux stream. The latter piston is ordinarily operated at a frequency greater than that of the former, so that during a sustained movement of solids within a given time interval, an intermittent counterflow of reflux liquid is simultaneously effected.

A further suitable modification of the invention can be provided by positioning in reflux zone C a heat-transfer grid of the type shown in the copending application of T. A. Tarr, Serial No. 477,099, filed December 22, 1954.

It has been found that certain ranges of frequency of pulsation of the back-pressure applied according to this invention produces results superior to certain other ranges of frequency. In the separation of para-xylene from its isomers, improved results are obtainable at a frequency as low as 15 pulsations per minute or as high as 200 pulsations per minute. However, outstanding results are obtained at from 50 to 165 pulsations per minute. Highly superior results are obtained in the range from 125 to 150 pulsations per minute. It has been found that within the preferred range the operation of the purification column is greatly stabilized and the movement of material therethrough is greatly facilitated. Thus the attainment and maintenance of phase equilibrium, as indicated by temperature gradients within the column, is greatly facilitated by the use of pulsating back-pressure and reflux flow according to this invention. As regards production of a high-purity product consistently over an extended period of time, a critical lower limit of frequency exists at about 50 pulsations per minute in the purification of para-xylene. Broadly, however, the invention is not so limited.

The dimensions of the cylinder and piston used to produce the back-pressure pulsation can vary over a rather wide range. It has been found that when a purification column 6 inches in diameter is used in conjunction with a two inch diameter piston for the separation of para-xylene from its isomers, the piston stroke can be in the range ½ to 2½ inches, preferably ¾ to 2 inches, and it has been found that a 1-inch stroke appears to produce optimum results in terms of ease and stability of operation. Optimum dimensions in any particular case can readily be determined by trial by those skilled in the art. It is to be understood that the dimensions, configurations, and frequencies stated above are not necessarily optimum for every material to be purified.

As previously described, it has been found desirable to maintain a predetermined back-pressure on the filtrate withdrawal conduit. It appears that, by controlling the back-pressure, the proportion of solids in the feed to the purification column is, in turn, controlled. A back-pressure in the range 70 to 150 p. s. i. has been found highly desirable in the purification of para-xylene. This feature is disclosed and claimed in copending application Serial No. 514,499, filed June 10, 1955, by J. D. Ratje.

It is often desirable to control the relative proportions of solid and liquid in the feed which is introduced into the purification column. It is generally desired that this proportion be such that the mixture has sufficient of the properties of a liquid or slurry to allow transfer of the mixture by pumping. On the other hand, it is generally desirable to have sufficient solids present so that the mixture has some apparent compressibility; otherwise a waterhammer effect is sometimes produced by the action of the means provided to produce a pulsating back-pressure. The optimum ratio of solids to liquid depends on the particular materials to be separated, on crystal size, and on other factors and can readily be determined in any particular case by routine test. As a general rule, the solids content of the mixture fed from the chiller into the purification column is within the range 20 to 36 weight percent, and preferably 25 to 30 weight percent. However, solids contents outside the stated ranges can be used.

Although the back-pressure within the purification column is preferably applied by the piston or other pulsator in a regular or periodic or pulsating manner, an irregular or non-periodic increase of back-pressure is within the scope of the invention. It is also within the scope of the invention to operate with a compression stroke of the pulsator which is of longer duration than the return stroke or vice versa. This can be effected by suitable mechanical lost-motion devices connected with the means used to connect the piston or other pulsator to the source of motive power. Such devices are well known in the art. Also, electrical, pneumatic or hydraulic actuation of the pulsating mechanism can be utilized in place of purely mechanical actuation.

It is also within the scope of the invention to utilize two or more purification units, of the type described, in series. This type of operation is of particular value when the raw material from which it is desired to concentrate a particular component is relatively dilute with respect to that component. For example, in a hydrocarbon mixture containing approximately 18 weight percent para-xylene together with other xylenes and ethylbenzene, the raw mixture can be passed through a purification unit of the type described in Figure 1 to produce a concentrate containing, for example, 60 weight percent para-xylene, which concentrate can then be passed, after at least partial melting, if desired, to a second unit of the type shown in Figure 1. The first unit can be operated with or without the use of pulsating back-pressure, a pulsating back-pressure being used in the second unit. More than two such units can be used in series. Alternatively, the preliminary concentration can be accomplished by crystallization and subsequent filtration, although this method is not necessarily equivalent to the use of two or more pulsator-equipped units in series as previously described.

The use of parallel arrangements of two or more units of the type described is also within the scope of the invention. Combinations of series and parallel arrangements are also feasible.

From the foregoing, it will be seen that, according to this invention, a pressure in the melting zone of an apparatus of the type described is intermittently produced, which pressure is greater than that at the locus of filtrate withdrawal. An intermittent reflux flow is thus created simultaneously with the propulsion of solids through the apparatus.

In the following examples, the operation of a column in accordance with this invention is illustrated, in connection with the separation and purification of para-xylene from a mixture of para-xylene with ortho- and meta-xylenes and ethyl benzene.

EXAMPLE I

The purification unit utilized in these examples was of the type illustrated in Figure 1. The purification column was constructed of flanged steel pipe 6 inches in diameter and approximately 2½ feet in length, the column being horizontally positioned. Connected to one end of the column was a 6 inch diameter scraped-surface chiller, 20 feet in length and connected to the column by means of flanges at an angle of 8° 40' with the horizontal. The chiller was provided with a jacket through which coolant was circulated. Within the chiller was a scraper of the type illustrated in Figure 1. Adjacent the end of the column to which the chiller was connected was a wall filter 10 inches long, with a filtrate withdrawal conduit. In the opposite end of the purification column was positioned an electrical heater approximately 6 to 8 inches from the product outlet end. A product withdrawal conduit was connected to the melting end of the column. This end of the column was provided with a flange to which was connected a 2-inch diameter cylinder provided with a piston, as illustrated in Figure 1. The 2-inch piston was driven by means of a mechanical linkage with a rotary electric motor, said linkage being such that the piston stroke and the rate of reciprocation could be varied over a rather broad range. A commercially available temperature recorder-controller was provided for measuring the temperature at the electrical heater within the column and controlling the product withdrawal rate, in response to said temperature, by control of a valve in the melt withdrawal line. The controller was operated to keep the downstream end of the crystal mass in contact with the electrical heater. Thus, if crystals melted upstream from the heater, the withdrawal rate was automatically increased, and if crystals moved past the heater, the withdrawal rate was automatically decreased. During some of the runs, a solenoid valve positioned in the filtrate withdrawal line was synchronized with the 2-inch piston by means of a microswitch actuated by a cam attached to the cylinder connecting rod. Thus, when the piston was moving in a direction opposite to that of crystal movement, the solenoid valve in the filtrate line opened so that filtrate was withdrawn; on the opposite stroke of the piston, the solenoid valve closed, and no filtrate was removed.

A feed comprising 60 weight percent para-xylene, the impurities being chiefly ortho- and meta-xylene and ethyl benzene, was supplied to the chiller. Representative data obtained under different conditions are shown in the following tables.

Table I

OPERATING DATA

[6-inch diameter, horizontal, pulsed column with 60 percent p-xylene feed—fractional crystallization]

| Period of operation, hr. | Temperatures, °F. | | | Pressures, p. s. i. g.[1] | | | | Heat- watts | Pulse piston | | Rates, G. P. H. | | Calculated slurry quality, wt. percent solids | Stream compositions, mol percent p-xylene | | |
|---|---|---|---|---|---|---|---|---|---|---|---|---|---|---|---|---|
| | Chiller outlet | Wall liquor | Heater section | Chiller feed | Chiller outlet | Column ML | Product | | Stroke, in. | Cycles, min. | Product | ML | | Feed | ML | Composite product |
| 2 | 3 | 5–7 | 67–73 | 100 | 115 | 100 | 120 | 2,610 | 1 | 140 | 11.9–13.8 | 42–46 | 27.5 | 60 | 47 | 98.5–99.1 |
| 2 | 2–4 | 4–10 | 69–72 | 92–95 | 105 | 95 | 110 | 2,610 | 1 | 140 | 12.4–14.9 | 40–46 | 27.5 | 60 | 47 | 98.9 |
| 2 | 4–5 | 5–9 | 67–72 | 90 | 105 | 95 | 110 | 2,610 | 1 | 140 | 12.8–13.3 | 39–43 | 26.0 | 60 | 47 | 98.3–98.9 |
| 3 | 4–5 | 6–10 | 66–73 | 87–90 | 105 | 95 | 110 | 2,610 | 1 | 140 | 12.5–14.4 | 37–44 | 26.0 | 60 | 47 | 97.6–98.9 |
| 3.5 | 4–5 | 5–7 | 68.73 | 96–110 | 110 | 105 | 125 | 2,610 | 1 | 140 | 14.3–15.8 | 37–40 | 26.0 | 60 | 46 | 98.9–99.6 |
| 1.5 | 5 | 5–6 | 67–70 | 120–130 | 115 | 100 | 135 | 2,610 | 1 | 140 | 14.5–15.4 | 34–38 | 25.5 | 59 | 46 | 99.4–99.6 |
| 1 | 4–5 | 4–6 | 71 | 130–145 | 120 | 95 | 130 | 2,610 | 1 | 140 | 15.5 | 37–39 | 26.0 | 59 | 46 | 99.5 |
| 1.5 | 3–5 | 4–6 | 70–74 | 150–157 | 120 | 90 | 130 | 2,610 | 1 | 140 | 14.1–15.5 | 36–40 | 26.5 | 60 | 46 | 99.5–99.6 |
| 2.5 | 3–5 | 3–5 | 70–74 | 100 | 110 | 105 | 125 | 2,610 | 1 | 140 | 14.0–15.4 | 37–40 | 26.5 | 60 | 46 | 99.5–99.6 |
| 2 | –1 to +2 | –1 to +3 | 69–71 | 100 | 115 | 100 | 115 | 2,610 | 1 | 140 | 14.0–15.0 | 33–38 | 30.0 | 60 | 42–44 | 98.9–99.5 |
| 2 | –3 to –5 | –1 to –4 | 67–73 | 100 | 105 | 95 | 110 | 2,610 | 1 | 140 | 14.0–14.2 | 26–31 | 33.5 | 59 | 39–42 | 99.0–99.1 |
| 3 | –8 to –9 | –7 | 67–76 | 100 | 95 | 100 | 100 | 2,610 | 1 | 140 | 14.2–14.9 | 22–24 | 36.5 | 60 | 35–37 | 97.4–98.9 |
| 1.5 | 5–7 | 6–7 | 66–71 | 100 | 110 | 105 | 120 | 2,610 | 1 | 140 | 14.3–18.1 | 38–43 | 24.5 | 60 | 45–47 | 98.4–99.0 |
| 1 | 8–10 | 8–10 | 69–70 | 95 | 115 | 105 | 125 | 2,660 | 1 | 140 | 14.0–14.6 | 47–52 | 20.5 | 60 | 48–50 | 98.5–99.0 |
| 1 | 10–11 | 10–11 | 67–72 | 95 | 115 | 105 | 125 | 2,660 | 1 | 140 | 14.9–15.7 | 56–59 | 19.0 | 60 | 49–50 | 96.7–97.8 |

[1] Column pressures cycle with the pulse piston cycle. Gauges were snubbed; hence, they tend to record average pressures. Average pressures are shown in the table.
ML = mother liquor.

Table II

RESULTS OF TESTS OF CONTROL DEVICES

[6-inch diameter, horizontal, pulsed column with 60 percent p-xylene feed—fractional crystallization]

| Duration of run, hr. | Temperature, °F. | | | Pressures, p. s. i. g. | | | Heat, watts | Pulse piston | | Rates, G. P. H. | | Stream compositions, mol percent p-xylene | | | Notes |
|---|---|---|---|---|---|---|---|---|---|---|---|---|---|---|---|
| | Chiller outlet | Wall liquor | Heater section | Chiller outlet | ML | Product | | Stroke, in. | Cycles, min. | Product | ML | Feed | ML | Composite product | |
| 1.5 | 3–6 | 3–7 | 68–70 | 100 | 95 | 115 | 2,660 | 1 | 140 | 14.3–14.5 | | 60 | 44 | 98.5–99.2 | |
| 1.5 | 2 | 2–3 | 69–70 | 95 | 90 | 100 | 2,610 | 1 | 140 | 13.2–14.5 | 20–31 | 60 | 44 | 99.2–99.5 | (a) |
| 1.5 | 2–3 | 3 | 69–74 | 90 | 90 | 100 | 2,610 | 1 | 140 | 13.4–14.3 | 30–32 | 60 | 44 | 99.5 | (a) (b) |
| 1.5 | 1 | 1–2 | 69–73 | 90 | 80 | 100 | 2,610 | 1 | 140 | 16–14.0 | 30–31 | 60 | 44 | 99.3–99.4 | (a) (b) (c) |
| 7.5 | 1–2 | 1–2 | 73–80 | 95 | 85 | 100 | 2,610 | 1 | 140 | 12.8–14.0 | 29–36 | 60 | 44 | 99.1–99.2 | (a) (b) (c) |
| 4 | 0–2 | 1–2 | 75–82 | 95 | 80 | 100 | 2,610 | 1 | 140 | 12.9–13.6 | 28–32 | 60 | 43 | 99.0–99.7 | (a) (b) (c) (d) |
| 3 | 1 | 1–2 | 76–79 | 105 | 80 | 115 | 2,610 | 1 | 140 | 13.4–13.8 | 33–34 | 60 | 44 | 98.4–99.3 | (a) (b) (d) |
| 2.5 | 1 | 2 | 75–78 | 100 | 85 | 110 | 2,690–2,995 | 1 | 140 | 13.9 15.6 | 34–36 | 60 | 43 | 98.9–99.4 | (a) (b) (d) |
| 2 | 1 | 2 | 81–85 | 100 | 85 | 110 | 3,095–3,275 | 1 | 140 | 15.2–16.3 | 36–39 | 60 | 42 | 98.1–98.4 | (a) (b) (d) |
| 3.5 | 0–3 | 1–3 | 81–85 | 100 | 80 | 110 | 3,335–3,590 | 1 | 140 | 15.5–17.5 | 36–44 | 60 | 42 | 98.0–98.5 | (a) (b) (d) |
| 4.5 | –1 to +1 | –1 to +2 | 81–85 | 90 | 70 | 100 | 3,690–3,795 | 1 | 140 | 17.5–18.5 | 33–43 | 60 | 42 | 98.0–99.0 | (a) (b) (d) |
| 2.5 | 1–2 | 1–3 | 83–85 | 90 | 65 | 100 | 3,860–3,995 | 1 | 140 | 18.7–19.7 | 44–49 | 60 | 43 | 98.5–99.1 | (a) (b) (d) |
| 4 | 2–3 | 3–5 | 77–86 | 90 | 55 | 100 | 4,055–4,195 | 1 | 140 | 19–7–21.6 | 49–62 | 60 | 44 | 97.9–99.0 | (a) (b) (d) |

(a) Chiller feed surge pot was bypassed.
(b) The mother liquor solenoid valve, used on cycle control in phase with piston motion, was bypassed.
(c) The check valve on the mother liquor line from the column was bypassed.
(d) A back-pressure control and motor valve were used in place of an integral back-pressure regulator used in other runs.

Table III
OPERATING DATA
[6-inch diameter, horizontal, pulsed column 60 percent p-xylene feed—fractional crystallization.]

| Duration of run, hr. | Temperatures, °F. | | | Pressures, p. s. i. g. | | | Heat, watts | Pulse piston | | Rates, G. P. H. | | Stream composition, mol percent p-xylene | | | |
|---|---|---|---|---|---|---|---|---|---|---|---|---|---|---|---|
| | Chiller outlet | Wall liquor | Heater section | Chiller outlet | ML | Product | | Stroke, in. | Cycles, min. | Product | ML | Feed | ML | Composite product |
| 1.5 | 0-2 | 2.4 | 67-70 | 90 | 85 | 90 | 2,645 | 7/8 | 140 | 12.8-13.3 | 41-45 | 58 | 46 | 98.4-99.0 |
| 3.5 | 2-5 | 4-6 | 61-70 | 90 | 90 | 90 | 2,130-2,645 | 5/8 | 140 | 9.7-13.8 | 23-50 | 58 | 47 | 91.5-98.5 |
| 4.5 | 0-2 | 1-6 | 67-82 | 80 | 80 | 90 | 2,130-2,810 | 3/4 | 140 | 11.4-15.1 | 28-40 | 59 | 45 | 96.2-97.6 |
| 3.5 | 1-3 | 2-4 | 80-86 | 80 | 80 | 85 | 2,750-2,945 | 3/4 | 140 | 12.6-14.8 | 32-37 | 60 | 44 | 98.9-99.1 |
| 1 | 2 | 4 | 68-70 | 85 | 85 | 90 | 2,995 | 3/4 | 140 | 14.7-15.0 | 38 | 60 | 44-48 | 94.1-98.9 |
| 4 | 1-5 | 2-5 | 66-79 | 95 | 90 | 95 | 2,765 | 1 1/8 | 140 | 12.9-24.8 | 30-38 | 60 | 44 | 98.1-98.6 |
| 4.5 | 1-3 | 3-5 | 66-78 | 100 | 80 | 105 | 2,575 | 1 1/4 | 140 | 11.4-14.9 | 31-39 | 60 | 44 | 98.0-99.5 |
| 2.5 | 3-4 | 5.7 | 72-82 | 105 | 85 | 105 | 2,590 | 3/4 | 160 | 10.2-12.9 | 38-44 | 60 | 45 | 98.0-99.5 |
| 2 | 3-4 | 6-25 | 76-82 | 105 | 90 | 115 | 2,590 | 3/4 | 160 | 11.6-13.0 | 40-44 | 60 | 45 | 98.0-98.9 |
| 2 | 1-2 | 1-4 | 74-85 | 95 | 80 | 95 | 2,390 | 1 1/8 | 128 | 8.9-11.9 | 27-31 | 61 | 44 | 98.1-98.6 |
| 3.5 | 1-2 | 4-5 | 73-79 | 105 | 90 | 105 | 2,440 | 1 1/8 | 128 | 10.6-12.7 | 32-34 | 61 | 45 | 98.0-98.5 |
| 5.5 | 1 | 2-5 | 73-77 | 105 | 85 | 110 | 2,160 | 1 1/8 | 128 | 9.5-10.8 | 28-32 | 60 | 45 | 98.4-98.9 |
| 6.5 | 1-2 | 2-5 | 56-61 | 105 | 90 | 105 | 1,880 | 7/8 | 128 | 8.8-11.1 | 27-31 | 60 | 45 | 98.0-99.1 |

The foregoing data show that good results were obtained at a pulsation frequency of approximately 125 to 160 pulsations per minute. A frequency of 140 pulsations per minute appeared to be optimum. It will be noted that throughput rates of the order of 35 to 36 gallons per hour were readily maintainable with the 6-inch diameter column. This is equal to rates which are consistently attained in an 8-inch diameter column in commercial operation without the pulsation feature of this invention. Thus, it is clear that this invention provides high throughputs, stable operation and high product purity.

EXAMPLE II

In a system of the type described in Example I, further data were obtained showing the results of varying certain other process variables.

pressure reached 120 p. s. i. The data for which no times are given represent individual readings in runs varying in length from several hours to several days.

EXAMPLE III

This example illustrates the effect of pulsation frequency on the purification of para-xylene according to this invention.

The apparatus utilized in this example was similar to that utilized in the preceding example but had the following differences:

(1) The purification column was vertically positioned and had a length of approximately 26 inches and a diameter of approximately 5 7/8 inches. The filter was 7 inches long and provided 46 square inches of filtration area. The purification column was connected, by means

Table IV
[6-inch diameter, horizontal, pulsed column—60 percent p-xylene feed.]

| Duration of run, hr. | Temperature, °F. | | | Pressure, p. s. i. g.[1] | | | | Heat, watts | Rate, cycles, min. | Stroke, in. | Flow rates, G. P. H. | | Stream compositions, mol percent p-xylene | | |
|---|---|---|---|---|---|---|---|---|---|---|---|---|---|---|---|
| | Chiller outlet | Wall liquor | Heater section | Chiller | | Column | | | | | Product | ML | Feed | ML | Composite product |
| | | | | In | Out | ML | Product | | | | | | | | |
| 3.5 | 0-1 | 0-1 | 73-81 | 90 | 85 | 65 | 150 | 3,160-3,850 | 160 | 1 5/16 | 12.8-18.4 | 30-46 | 57 | 41-44 | 94.7-96.2 |
| 3 | 4 | 4-5 | 66-74 | 110 | 70 | 35 | 175 | 2,260-2,320 | 160 | 1 1/4 | 11.6-14.1 | 34-43 | 56 | 43-44 | 94.7-97. |
| 4.5 | 0 to +21 | 1-3 | 69-72 | 115 | 110 | 85 | 100 | 2,590 | 140 | 1 | 12.9-13.5 | 38-40 | 56 | 43-44 | 98.0-99.2 |
| 3.5 | 0-1 | −1 to +1 | 61-68 | 120 | 120 | 80 | 115 | 2,590 | 140 | 1 | 11.8-15.8 | 30-49 | 57 | 41-43 | 99.3-99.9 |
| 5.5 | 6-7 | 7-9 | 63-69 | 115 | 120 | 100 | 120 | 3,080-3,320 | 140 | 1 | 16.0-16.9 | 54-60 | 60 | 46-47 | 98.2-98.7 |
| 7.5 | 3-4 | 4-6 | 60-71 | 105 | 115 | 80 | 120 | [2] 4,150 | 140 | 1 | 20.4-21.9 | 58-62 | 60 | 46-47 | 98.5-98.9 |
| | 4 | 5 | 56 | 105 | 120 | 80 | 120 | [2] 4,150 | 140 | 1 | 23.2 | 65.2 | 60 | 47 | 96.1 |
| | 4 | 6 | 67 | 105 | 125 | 80 | 115 | [2] 4,150 | 140 | 1 | 19.7 | 57.8 | 60 | 46 | 98.4 |
| | 3 | 3 | 80 | 95 | 105 | 80 | 120 | [2] 4,150 | 140 | 1 | 19.0 | 51.1 | 60 | 46 | 99.1 |
| | 4 | 6 | 97 | 105 | 120 | 80 | 110 | [2] 4,150 | 140 | 1 | 17.6 | 52.4 | 60 | 46 | 98.0 |
| | 3 | 4 | 71 | 110 | 90 | 80 | 105 | 2,610 | 140 | 1 | [3] 13.0 | 36.9 | 59 | 44 | 99.3 |
| | 3 | 3 | 58 | 110 | 100 | 80 | 125 | 2,610 | 140 | 1 | [3] 13.8 | 39.8 | 59 | 45 | 99.3 |
| | 4 | 4 | 53 | 110 | 100 | 80 | 110 | 2,610 | 140 | 1 | [3] 15.6 | 45.0 | 59 | 45 | 98.0 |
| | 4 | 4 | 74 | 100 | 90 | 75 | 95 | 2,610 | 140 | 1 | 12.1 | 32.7 | 60 | 42 | 99.5 |
| | 4 | 4 | 74 | 110 | 100 | 90 | 110 | 2,610 | 140 | 1 | 12.6 | 31.3 | 60 | 42 | 99.6 |
| | 4 | 5 | 74 | 110 | 100 | 100 | 95 | 2,610 | 140 | 1 | 13.0 | 33.7 | 60 | 45 | 99.0 |
| | 5 | 5 | 73 | 120 | 120 | 110 | 130 | 2,610 | 140 | 1 | 13.2 | 33.3 | 60 | 46 | 99.1 |
| | 4 | 5 | 75 | 125 | 120 | 115 | 130 | 2,610 | 140 | 1 | 12.7 | 30.8 | 60 | 45 | 98.6 |
| | 4 | 5 | 70 | 125 | 125 | 120 | 130 | 2,610 | 140 | 1 | 12.8 | 35.4 | 60 | 46 | 92.7 |
| | 4 | 4 | 76 | 125 | 120 | 105 | 125 | 2,610 | 140 | 1 | 12.4 | 33.8 | 60 | 45 | 99.5 |
| | 4 | 5 | 73 | 110 | 100 | 80 | 100 | 2,610 | 140 | 1 | 12.5 | 34.6 | 60 | 45 | 99.3 |

[1] System pressures cycle at the same rate as the pulse unit. Gauges are snubbed and tend to indicate average pressures.
[2] Maximum heating rate with installed heater.
[3] Estimated.

The foregoing data show that a back-pressure on the filtrate withdrawal line in the range 75 to 120 p. s. i. is highly desirable in the described purification of para-xylene. The product purity decreased when the back-pressure reached 120 p. s. i. The data for which no of an elbow, with a chiller, of the type utilized in the previous examples, the chiller being positioned at a slight angle with respect to the horizontal so that the outlet end connected to the purification column was lower than the feed inlet end. This apparatus provided a gravity reflux when the pulsating piston was not used. Thus, the performance of the column with and without the pulsating piston, according to this invention, was compared. Table V shows results obtained without the use of the pulsating piston according to this invention. Table VI shows the results obtained when the piston was utilized at various pulsation frequencies.

Table V

TYPICAL OPERATING DATA

[6-inch diameter inverted column (pulsed-piston not in operation) 60 percent p-xylene feed.]

| Temperatures, °F. | | | Pressures, p. s. i. g. | | | | Heat, watts | Rates, g. p. h. | | Stream composition, percent p-xylene | | | | Notes |
|---|---|---|---|---|---|---|---|---|---|---|---|---|---|---|
| Col. feed | ML | Col. base | Chiller | | Column | | | Product | ML | Feed | ML | Product | | |
| | | | In | Out | ML | Product | | | | | | | | |
| 8 | 12 | 105 | 95 | -------- | 25 | 25 | 960 | 5.8 | 17.3 | 60 | 49 | 81.8 | | (a) |
| 11 | 13 | 130 | 92 | -------- | 26 | 25 | 1,500 | 8.7 | 36.0 | 57 | 51 | 81.8 | | (a) |
| 9 | 8 | 170 | 88 | -------- | 26 | 27 | 2,180 | 11.0 | 35.4 | 58 | 51 | 83.0 | | (a) |
| 9 | 13 | 178 | 92 | -------- | 27 | 26 | 2,310 | 9.6 | 19.4 | 58 | 51 | 80.0 | | (a) |
| 11 | 14 | 190 | 95 | 33 | 26 | 26 | 3,190 | 13.1 | 21.2 | 60 | 48 | 78.3 | | (a) |
| 14 | 16 | 198 | 95 | 37 | 25 | 26 | 3,390 | 13.5 | 28.9 | 59 | 50 | 79.5 | | (a)(b) |
| 13 | 15 | 165 | 55 | 29 | 25 | 26 | 2,740 | 10.8 | 23.0 | 59 | 50 | 78.2 | | (c) |
| 11 | 14 | 178 | 165 | 35 | 25 | 25 | 2,760 | 11.3 | 22.8 | 59 | 49 | 80.5 | | (c) |
| 12 | 15 | 182 | 195 | 42 | 25 | 25 | 2,760 | 11.3 | 24.9 | 59 | 46 | 81.8 | | (c) |
| 13 | 14 | 168 | 95 | 15 | 5 | 8 | 2,840 | 12.8 | 32.4 | 59 | 49 | 79.0 | | (d) |
| 11 | 17 | 164 | 98 | 45 | 35 | 35 | 2,840 | 15.0 | 34.8 | 59 | 49 | 78.0 | | (d) |
| 10 | 15 | 163 | 100 | 65 | 65 | 65 | 2,860 | 13.4 | 16.9 | 59 | 50 | 76.2 | | (d) |
| 12 | 15 | 105 | 95 | 40 | 20 | 23 | 2,740 | 19.9 | 34.6 | 59 | 49 | 79.0 | | (e) |
| 19 | 13 | 149 | 100 | 34 | 20 | 22 | 2,740 | 20.7 | 23.6 | 60 | 49 | 78.5 | | (e) |
| 11 | 15 | 195 | 100 | 25 | 20 | 20 | 2,760 | 11.1 | 15.2 | 60 | 49 | 79.5 | | (e) | a A study of the effect of throughput on product purity.
b The 3,390 watt heating rate was the full capacity of the installed heaters.
c A study of the effect of feed pressure on operating characteristics.
d A study of the effect of product-line back-pressure on operating characteristics.
e A study of the effect of heater zone temperature on operating characteristics.

Table VI

OPERATING DATA

[6-inch diameter, inverted, pulsed column—60 percent p-xylene feed.]

| Temperature, °F. | | | Pressures, p. s. i. g. | | | | Heat, watts | Pulse piston | | Rates, g. p. h. | | Stream compositions, percent p-xylene | | | | Notes |
|---|---|---|---|---|---|---|---|---|---|---|---|---|---|---|---|---|
| Col. feed | ML | Col. base | Chiller | | Column | | | Speed, cycles/min. | Stroke, in. | Product | ML | Feed | ML | Product | Comp. product | |
| | | | In | Out | ML | Product | | | | | | | | | | |
| 13-14 | 19-24 | 86-90 | 60-62 | 57-58 | 65 | 65-67 | 1,240 | 16 | 2 | 1.0-3.4 | 35.6-38.8 | 59 | 56 | 82.0-83.5 | -------- | -------- |
| 16 | 20 | 122 | 62 | 60 | 13 | 0 | 1,680 | 16 | 2 | 3.4 | 43.2 | 59 | 52 | 88.0 | 80.7 | -------- |

Product rate control based on heater zone temperature used in all following tests

| 16 | 18 | 127 | 74 | 73 | 75 | 75 | 2,110 | 16 | 2 | 11.6 | 33.6 | 59 | 51 | 85.5 | 79.5 | (a) |
| 15 | 19 | 151 | 68 | 68 | 68 | 67 | 2,110 | 16 | 2 | 10.2 | 42.3 | 59 | 52 | 88.0 | 88.0 | (a) |
| 13-16 | 17-18 | 143-146 | 60 | 60 | 70 | 73 | 2,110 | 16 | 2 | 9.2-9.7 | 36.0-37.4 | 59 | 52 | 89.5 | 89.5 | (a) |
| 17 | 18 | 148 | 60 | 60 | 65 | 70 | 2,110 | 16 | 2 | 9.2 | 34.2 | 58 | 54 | 93.4 | 88.0 | (a) |
| 14-15 | 18-30 | 113-123 | 55-59 | 50-55 | 55-57 | 55-65 | 2,110 | 16 | 2 | 0.9-9.1 | 48.9-74.0 | 59 | 54 | 79.7 | 79.7-82.0 | (b) |
| 15 | 16 | 57 | 55 | 55 | 55 | 75 | 1,680 | 16 | 2 | 10.6 | 42.5 | 57 | 52 | 92.0 | 91.0 | (a) |
| 13-15 | 15-17 | 116-130 | 140-145 | 135-140 | 135-145 | 125 | 2,180 | 32 | 2 | 11.1-14.3 | 21.9-26.8 | 59 | 52-53 | 78.5-81.7 | 79.5-80.5 | (a) |
| 15 | 15 | 157 | 120 | 120 | 120 | 140 | 2,310 | 32 | 2 | 8.5 | 39.0 | 60 | 52 | 97.2 | 94.4 | (a) |
| 13-16 | 15-16 | 93-118 | 130-135 | 125-135 | 127-135 | 60-68 | 2,610 | 32 | 2 | 7.2-12.2 | 24.6-32.0 | 60 | 52-54 | 86.0-87.5 | 76.0-85.5 | (d) |
| 11 | 14 | 143 | 120 | 120 | 115 | 40 | 2,120 | 32 | 2 | 7.9 | 36.4 | 60 | 50 | 97.1 | 97.1 | (d) |
| 12 | 14 | 138 | 105 | 105 | 102 | 23 | 2,120 | 32 | 2 | 7.1 | 26.8 | 60 | 50 | 98.5 | 96.9 | (d) |
| 9-14 | 13 | 138-159 | 120-130 | 115-130 | 35-135 | 90-110 | 2,140 | 32 | 2 | 7.9-9.4 | 18.9-27.1 | 60 | 50-51 | 90.5-94.5 | 85.5-9.20 | (d) |
| 13-16 | 15-16 | 133-138 | 50-150 | 50-150 | 40-120 | 175-200 | 2,170 | 66 | 2 | 8.5-9.0 | 32.9-39.8 | 59 | 52-53 | 98.6-99.0 | 97.1-98.6 | (d) |
| 16 | 16 | 131 | 55-160 | 60-160 | 40-140 | 150 | 2,170 | 66 | 2 | 8.8 | 35.9 | 59 | 52 | 98.9 | 98.6 | (d) |
| 10 | 16 | 157 | 75-105 | 65-100 | 50 | 40-105 | 2,160 | 66 | ¾ | 8.2 | 31.9 | 58 | 50 | 95.5 | 96.1 | (d) |
| 14 | 15 | 144 | 80-110 | 75-115 | 65-75 | 130 | 2,290 | 66 | 1¼ | 7.5 | 42.0 | 59 | 52 | 98.9 | 98.0 | (d) |
| 15 | 15 | 154 | 60-100 | 60-100 | 50-60 | 110 | 2,160 | 66 | 1¼ | 6.6 | 44.0 | 60 | 52 | 98.5 | 96.8 | (d) |
| 12 | 17 | 159 | 80-125 | 75-110 | 40-50 | 0 | 2,160 | 99 | 2 | 7.2 | 34.0 | 59 | 51 | 98.4 | 97.4 | (d) |
| 12-15 | 17-18 | 124-150 | 25-85 | 105-115 | 70-100 | 25-280 | 2,160 | 99 | 2 | 8.4-8.8 | 33.7-46.7 | 59 | 50-55 | 98.9-99.1 | 93.1-97.1 | (d) |
| 9 | 15 | 156 | 40 | 115 | 50-55 | 15 | 2,160 | 99 | 2 | 7.6 | 32.0 | 59 | 49 | 97.7 | 97.7 | (d) |
| 10-12 | 13-14 | 150-156 | 75-120 | 75-125 | 15-115 | 0-200 | 2,420 | 99 | 1 | 7.9-8.4 | 39.5-41.8 | 59 | 47-49 | 99.5-99.7 | 99.4-99.6 | (d) |
| 5-13 | 12-17 | 129-167 | 60 | 70 | 20-100 | 0-150 | 2,260 | 127 | 1 | 4.4-6.8 | 27.0-33.0 | -------- | 43-47 | 94.1-96.7 | 94.7-96.1 | (d) | a Mother liquor rate was controlled by mother liquor back pressure regulation.
b Mother liquor rate was controlled by instrument, based on the chiller outlet pressure.
c A cycling control of mother liquor was used, with maximum flow during the pressure stroke of the pulse piston and minimum flow during the suction stroke.
d The mother liquor rate was placed on an "on-off" cycle synchronized with piston motion. Flow was "on" during the pressure stroke of the piston and "off" during the suction stroke. Back-pressure regulation was used in addition to the cyclic control.

From the foregoing data, it will be noted that a feed containing approximately 60 weight percent para-xylene could be concentrated to a purity of the order of 80 to 83 percent without the use of the piston. Use of the piston at a frequency of 16 cycles per minute produced some increase in purity of the para-xylene product. Increasing the frequency to 32 cycles per minute resulted in a further increase in purity. Further increase to 66 and to 99 cycles per minute, and a further increase to 127 cycles per minute, produced much improved results. It will be noted that below 66 pulsations per minute, although high-purity product was produced, the purity varied, whereas at frequencies of 66 pulsations per minute and higher, high purity para-xylene was constantly and consistently produced with little variation in purity. Thus, a pulsation frequency of approximately 50 pulsations per minute represents a critical low frequency limit at which high-purity para-xylene can be constantly produced. However, satisfactory results are obtained at lower frequencies.

In order to illustrate some of the systems to which the invention is applicable, the following compounds are grouped with respect to their boiling points and freezing points.

| | B. P., °C. | F. P., °C. |
|---|---|---|
| Group A: | | |
| Benzene | 80 | 5.5 |
| n-Hexane | 69 | −94 |
| n-Heptane | 98.52 | −90.5 |
| Carbon tetrachloride | 77 | −22.8 |
| Acrylonitrile | 79 | −82 |
| Ethyl alcohol | 78.5 | −117.3 |
| 2,2-dimethylpentane | 79 | −125 |
| 3,3-dimethylpentane | 86 | |
| Methyl ethyl ketone | 79.6 | −86.4 |
| Methyl propionate | 79.9 | −87.5 |
| Methyl acrylate | 80.5 | |
| 1,3-cyclohexadiene | 80.5 | −98 |
| 2,4-dimethylpentane | 80.8 | −123.4 |
| 2,2,3-trimethylbutane | 80.9 | −25 |
| Cyclohexane | 81.4 | 6.5 |
| Acetonitrile | 82 | −42 |
| Cyclohexene | 83 | −103.7 |
| 2-methylhexane | 90 | −119 |
| 3-methylhexane | 89.4 | −119.4 |
| Group B: | | |
| Methyl cyclohexane | 100.3 | −126.3 |
| Cyclohexane | 81.4 | 6.5 |
| n-Heptane | 98.52 | −90.5 |
| 2,2,4-trimethylpentane (isooctane) | 99.3 | −107.4 |
| Nitromethane | 101 | −29 |
| p-Dioxane | 101.5 | 11.7 |
| 2-pentanone | 101.7 | −77.8 |
| 2-methyl-2-butanol | 101.8 | −11.9 |
| 2,3-dimethylpentane | 89.4 | |
| 3-ethylpentane | 93.3 | −94.5 |
| Group C: | | |
| Toluene | 110.8 | −95 |
| Methylcyclohexane | 100.3 | −126.3 |
| 2,2,3,3-tetramethyl butane | 106.8 | 104 |
| 2,5-dimethylhexane | 108.25 | −91 |
| 2,4-dimethylhexane | 110 | |
| 2,3-dimethylhexane | 113.9 | |
| 3,4-dimethylhexane | 116.5 | |
| 3-ethyl-2-methylpentane | 114 | |
| 3-ethyl-3-methylpentane | 119 | |
| Group D: | | |
| Aniline | 184.4 | −6.2 |
| Toluene | 110.8 | −95 |
| Benzene | 80.0 | 5.5 |
| Group E: | | |
| Carbon tetrachloride | 77 | −22.8 |
| Chloroform | 61 | −63.5 |
| CS₂ | 46.3 | −108.6 |
| Acetone | 56.5 | −95 |
| Group F: | | |
| Ortho-xylene | 144 | −27.1 |
| Meta-xylene | 138.8 | −47.4 |
| Para-xylene | 138.5 | 13.2 |
| Group G: | | |
| Ortho-cymene | 175.0 | −73.5 |
| Meta-cymene | 175.7 | >−25 |
| Para-cymene | 176.0 | −73.5 |
| Group H: | | |
| Dimethyl phthalate | 282 | 5.5 |
| Dimethyl isophthalate | 124 (12 mm.) | 67 |
| Dimethyl terephthalate | 288 | 140.6 |
| Group I: | | |
| Ortho-nitrotoluene | 222.3 | α−10.6 β−4.1 |
| Meta-nitrotoluene | 231 | 15.5 |
| Para-nitrotoluene | 238 | 51.3 |

Mixtures consisting of any combination of two or more of the components within any one of the groups can be resolved by the process of the invention, as can mixtures made up of components selected from different groups; for example, benzene can be separated from a benzene-n-hexane or a benzene-n-heptane mixture in which the benzene is present in an amount greater than the eutectic concentration. In the same manner, para-xylene can be readily separated from a mixture of para- and meta-xylenes or from para-, meta-, or ortho-xylenes. Benzene can also be separated from a mixture thereof with toluene and/or aniline. Multi-component mixtures which can be effectively resolved so as to recover one or more of the components in substantially pure form include mixtures of at least two of 2,2-dimethylpentane, 2,4-dimethylpentane, 2,2,3-trimethylbutane, methyl cyclohexane, and 2,2,4-trimethylpentane, and mixtures of at least two of carbon tetrachloride, chloroform, and acetone. The invention is also applicable to the separation of individual components from a mixture of cymenes.

This invention can also be utilized to purify crude naphthalene, hydroquinone (1,4-benzenediol), paracresol, para-dichlorobenzene, and such materials as high melting waxes, fatty acids, and high molecular weight normal paraffins. The invention can also be used to resolve a mixture comprising anthracene, phenanthrene, and carbazole. Furthermore, the invention can be used to separate durene (1,2,4,5-tetramethylbenzene) from other C₁₀ aromatics. In cases where the material to be purified has a relatively high crystallization point, the impure material is raised to a temperature at which only a portion of the mixture is in a crystalline state, and the resulting slurry is handled at such a temperature that operation is as described in connection with materials which crystallize at lower temperatures.

The invention is also applicable to the concentration of food products. In the preparation of such concentrated foods, the process consists generally of the removal of water, in the form of ice crystals, from such products. One special class of foods which can be concentrated in this manner is that of fruit juices, such as grape, pineapple, watermelon, apple, orange, lemon, lime, tangerine, grapefruit, and the like. Beverages, such as milk, wine, beer, coffee, tea, and various liquors, can also be concentrated in such a process. The process is also applicable to the concentration of vegetable juices.

From the foregoing, it will be seen that I have provided an improved process and apparatus in which solids, especially crystals, are moved through a crystal purification column having an intermediate filter section and a melting section with a reflux section therebetween, a varying or pulsating back-pressure being applied to the contents of the system simultaneously with the moving of the solids into said filter section. Variation and modification within the scope of the disclosure and the claims can readily be effected by those skilled in the art. While certain process steps, examples and structures have been described for purposes of illustration, it is clear that the invention is not limited thereto.

I claim:

1. In a process in which a confined mass of crystals and adhering mother liquor are passed through a liquid removal zone, from which mother liquor is removed a reflux zone and a melt zone, in which said crystals are melted, part of the melt being withdrawn from the system and the remainder being forced countercurrently into said reflux zone to establish a reflux stream which flows from said melt zone to said liquid removal zone, the improvement which comprises forcing said reflux into said reflux zone in the form of a pulsating stream by directly applying a pulsating pressure substantially only against said melt, the pulsation of said stream occurring during sustained application of force to said crystals to feed same into said liquid removal zone.

2. The process which comprises continuously applying motive force to a confined mass of crystals with adhering liquor to move said crystals through a liquid removal zone, a reflux zone and a melting zone, withdrawing liquid from said liquid removal zone, melting said crystals in said melting zone, withdrawing part of the resulting melt from the system as a product, and forcing the remainder of said melt into said reflux zone countercurrently with respect to the crystals moved by the described continuous application of motive force to said crystals, said melt being thus forced in the form of a pulsating stream by direct application of a pulsating pressure substantially only against said melt.

3. In a process in which a confined body of crystals and adhering liquor are intermittently moved through a liquid removal zone from which liquor is removed, a reflux zone and a melt zone in which said crystals are melted, part of the melt being withdrawn from the system and the remainder being forced countercurrently into said reflux zone to form a reflux stream which flows from said melt zone to said liquid removal zone, the improvement which comprises forcing the remainder of said melt into said reflux zone in the form of a pulsating stream wherein the frequency of pulsation is greater than the frequency of propulsion of said crystals through said liquid removal zone toward said melt zone.

4. In a process in which a confined mass of para xylene crystals and adhering liquid impurities are passed through a liquid removal zone from which said liquid impurities are removed, a reflux zone and a melt zone in which said crystals are melted, part of the melt being withdrawn from the system and the remainder being forced countercurrently into said reflux zone to form a reflux stream which flows from said melt zone to said liquid removal zone, the improvement which comprises directly applying a pulsating pressure substantially only against said melt and thus forcing said remainder of said melt into said reflux zone in the form of a pulsating stream having a pulsation frequency of from 15 to 200 pulsations per minute, the pulsation of said stream occurring during sustained application of force to said crystals to feed same into said liquid removal zone.

5. A process according to claim 4 wherein the solids content of said confined mass of crystals is in the range 20 to 36 weight percent.

6. A process according to claim 4 wherein the solids content of said confined mass of crystals is in the range 25 to 30 weight percent.

7. A process according to claim 4 wherein said pulsating stream has a frequency of at least 50 pulsations per minute.

8. A process according to claim 4 wherein said frequency of pulsation is in the range 50 to 165 pulsations per minute.

9. A process according to claim 8 wherein the frequency of pulsation is in the range 125 to 150 pulsations per minute.

10. A process which comprises chilling a fruit juice to obtain a confined mass of ice crystals, passing said crystals and adhering liquor through a filtration zone, removing liquor from said filtration zone as a product of the process, passing remaining solids through a reflux zone in countercurrent contact with liquid produced as subsequently described, passing the crystals into a melting zone and melting said crystals, removing part of the molten material from the system, passing the remainder of said molten material to said reflux zone in a direction countercurent to the movement of said crystals to form a reflux stream which flows from said melt zone to said filtration zone, said remainder of said molten material being supplied to said reflux zone in the form of a pulsating stream wherein pulsations are produced by directly applying a pulsating pressure substantially only against said molten material simultaneously with sustained application of force used to feed said crystals into said filtration zone.

11. A process for recovering para-xylene from a mixture comprising at least one other xylene and ethyl benzene, which process comprises cooling the mixture to obtain a solids content in the range 25 to 30 weight percent, said solids being preponderantly para-xylene crystals, passing the resulting mixture of crystals and liquid through a filtration zone, removing liquid from said filtration zone, passing the crystals, in the form of a confined mass of contiguous crystals with adhering mother liquor, through a reflux zone in counter-current contact with reflux liquid produced as subsequently described, passing the crystals into a melting zone and therein melting said crystals, withdrawing purified molten para-xylene as a product of the process, passing the remainder of the molten material, in the form of a pulsating stream, into said reflux zone in a direction counter-current to the movement of crystals therethrough, and directly applying a pulsating back-pressure substantially only to said molten material at a frequency in the range 125 to 150 pulsations per minute.

References Cited in the file of this patent

UNITED STATES PATENTS

| | | |
|---|---|---|
| 2,540,977 | Arnold | Feb. 6, 1951 |
| 2,598,449 | Scott et al. | May 27, 1952 |
| 2,615,794 | Shelby | Oct. 28, 1952 |
| 2,617,274 | Schmidt | Nov. 11, 1952 |
| 2,622,114 | Carney | Dec. 16, 1952 |
| 2,683,178 | Findlay | July 6, 1954 |
| 2,724,508 | Luther | Nov. 22, 1955 |

UNITED STATES PATENT OFFICE
Certificate of Correction

Patent No. 2,854,494            September 30, 1958

Rosswell W. Thomas

It is hereby certified that error appears in the printed specification of the above numbered patent requiring correction and that the said Letters Patent should read as corrected below.

Column 3, line 55, after the syllable "fication" and before the period insert —zone—; columns 7 and 8, Table I, fourth column thereof, under the heading "Heater section", fifth item, for "68.73" read —68–73—; same table, last column, under the heading "Composite product", tenth item, for "98.9–99.5" read —98.9–99.3—; same columns 7 and 8, Table II, eleventh column thereof, under the heading "Product", last item, for "19–7–21.6" read "—19.7–21.6—; columns 9 and 10, Table III, third column thereof, under the heading "Wall liquor", first item, for "2.4" read —2–4—; same table, same column, eighth item, for "5.7" read —5–7—; columns 9 and 10, Table IV, last column thereof, under the heading "Composite product", second item, for "94.7–97." read —94.7–97.1—; columns 11 and 12, Table VI, second column thereof, fifth item, opposite 14–15 for "18 30" read —18–30—; same table, sixteenth column thereof, under the heading "Comp. product", opposite "9–14" for "85.5–9.20" read —85.5–92.0—; column 13, in the table, approximately line 65, for ">−25" read —<−25—; same table, third column thereof, about line 67, preceding "Group H", insert —M. P.,° C.—.

Signed and sealed this 14th day of April 1959.

[SEAL]

Attest:
KARL H. AXLINE,
*Attesting Officer.*

ROBERT C. WATSON,
*Commissioner of Patents.*